United States Patent

[11] 3,581,279

[72] Inventor Timothy Arbuckle
Montclair, N.J.
[21] Appl. No. 831,293
[22] Filed June 9, 1969
[45] Patented May 25, 1971
[73] Assignee Computer Modem Corporation
Ft. Lee, N.J.

[54] SIGNAL TRANSMISSION METHOD AND SYSTEM
14 Claims, 2 Drawing Figs.

[52] U.S. Cl. .......... 340/146.1, 325/41, 325/38
[51] Int. Cl. .......... G08c 25/00, H04b 15/00
[50] Field of Search .......... 340/146.1; 325/41, 42, 38, 65; 235/181

[56] References Cited

UNITED STATES PATENTS

| | | | |
|---|---|---|---|
| 3,414,845 | 12/1968 | Lucky .......... | 325/41X |
| 3,502,986 | 3/1970 | Lucky .......... | 325/42X |
| 3,510,581 | 5/1970 | Craiglow et al. .......... | 325/65X |
| 3,510,640 | 5/1970 | Voecker, Jr. .......... | 325/38X |

OTHER REFERENCES

Howard D. Helms, Nonrecursive Digital Filters: Design Methods for Achieving Specifications on Freq. Response, IEEE Transactions on Audio and Electroacoustics, Vol. AU-16, No. 3 Sept. 1968, pp. 336— 42

Nowak and Schmid, A Nonrecursive Digital Filter for Data Transmission, IEEE Transactions on Audio and Electroacoustics, Vol. AU-16, No. 3, September 1968, pp. 343—349.

*Primary Examiner*—Malcolm A. Morrison
*Assistant Examiner*—Charles E. Atkinson
*Attorney*—Watson, Leavenworth & Kelton

ABSTRACT: A signal transmission system enabling exchange of the information content of message signals with substantial reduction of communication channel noise effects thereof. Message signals are converted into other signals actually transmitted. Received signals are reconverted to provide said message signals, the conversion and reconversion being of such nature as to effect substantially uniform distribution of channel noise in message signals derived from said received signals.

SIGNAL TRANSMISSION METHOD AND SYSTEM

SPECIFICATION

This invention relates to signal transmission systems and more particularly to method and apparatus for exchanging digital data signals over noisy communication channels with substantial reduction of the effects of noise on transmitted signals.

A primary consideration in the high-speed exchange of message signals over conventional communication channels, such as tariff telephone lines, is the adverse effect of channel noise on the intelligibility of received signals. Where channel noise is spatially coincident with an extended portion of transmitted message signals and of comparable power therewith, there results a high probability of uncorrectable unintelligibility in received signals. In this case retransmission is required until intelligible receipt is achieved. System transmission efficiency, measured on the basis of the volume of intelligible and useful information transmitted per unit of operating time, is substantially reduced by such noise-induced retransmissions.

Alternatively, channel noise of lesser time extent, such as spike noise, may be interspersed with message signals such than an erroneous message is received, comprised of the original message signal and an extraneous signal. In this case, error correction encoding apparatus is required in the system transmitter, and error detection and correction apparatus is required in the system receiver to provide a correct version of the transmitted message. While error correction apparatus is generally required to insure the detection and correction of random errors in transmitted signals, it is desirable to limit the error correcting capacity of such apparatus, since system transmission time is consumed in the exchange of error correction information. Typically, a message is encoded by interspersing error correction bits with message bits at the transmitter and is decoded by segregating same at the receiver. Since the former bits are not useful to message utilization devices, system transmission efficiency is inherently reduced by such error correction.

Improvements in transmission efficiency provided by reducing the effects of noise on transmitted signals will be evident. Transmission efficiency of a system will clearly improve by reduction of said noise-induced retransmissions and by reductions in required capacity of error correction apparatus.

Noise reduction by cable shielding and like structural techniques intended to isolate the communication channel from inductive or capacitive coupling to noise sources has long been recognized as essential but along ineffective to surmount transmission inefficiently and erroneous signal exchange. Thus, attention has been directed to quantitative and qualitative modification of message signals prior to transmission to increase transmitted signal-to-noise ratios and thereby improve transmission efficiency and enable correct information exchange without eliminating noise. One such quantitative method, that of increasing transmitter power, has an obvious physical limitation. A qualitative method, that of limiting the bandwidth of transmitted signals, involves an exchange of normally usable bandwidth for an improvement in signal-to-noise ratio. This method is evidently applicable only in those instances where bandwidth can be sacrificed.

It is an object of the present invention to provide a transmission system enabling exchange of information through noise communication channels with substantially reduced noise effects.

It is an additional object of this invention to provide a method for reducing the effects of communication channel noise on transmitted information without increasing transmitter output power or bandwidth limiting.

It is a further object of the invention to provide a digital data transmission system having improved transmission efficiency.

It the attainment of these objects the present invention involves a method and apparatus wherein each discrete signal of an original message intended to be exchanged is considered as constituting a signal indicative of the frequency spectrum of an undetermined signal. Such undetermined signal is generated in response to each said discrete original message signal by computation of the inverse Fourier transform thereof. A plurality of signals is generated in this manner to provide a second message and these second message signals are applied to the communication channel for transmission in place of said original message signals.

In transmission on the communication channel, there occurs a convolution of said second message signals and the communication channel transmission characteristic and the further addition of channel noise.

Transmitted second message signals so operated upon by the channel are received and converted into modified received signals, each representative of the frequency spectrum of a discrete one of said transmitted second message signals. This signal conversion is preferably performed by computation of the forward Fourier transform of each said received signal. Said modified received signals resulting from such conversion are indicative of said original message signals, noise effects therein being substantially reduced from noise effects which would be present therein had said original message signals been applied to the communication channel for direct transmission.

Where digital data signals constitute said original message signals the invention contemplates error correction and equalization steps. Transmitted signal modulation and received signal demodulation is also contemplated where required.

The foregoing and other objects and features of the invention will be evident from the following detailed description of preferred embodiments of the invention illustrated in the accompanying drawing.

Figure 1:
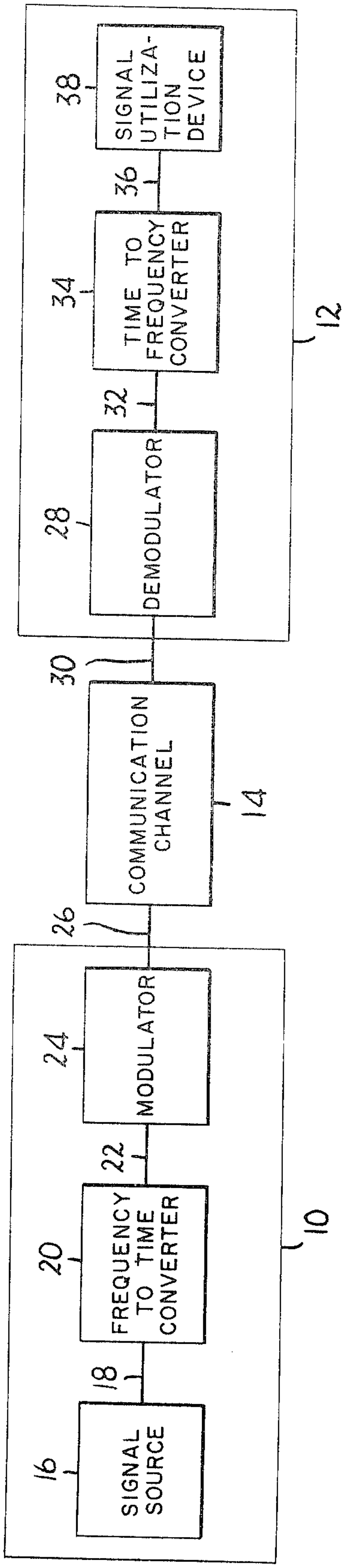
FIG. 1 is a functional block diagram of a signal transmission system constructed in accordance with the invention.

Referring to FIG. 1, the signal transmission therein illustrated provides for the exchange of original messages or information patterns between a transmitting station 10 and a receiving station 12 over a communication channel 14. Station 10 includes a signal source 16 adapted to generate discrete time-varying signals constituting said original messages which signals are applied over line 18 to a signal converter 20. Converter 20 is a frequency-to-time conversion device and includes circuitry adapted to generate, in response to each such discrete original message signal, a second message signal related in such a manner to said discrete original message signal that each original message signal represents the frequency spectrum of the second message signal generated in response thereto. Such circuitry may comprise, for example, an inverse Fourier transform computer operative to produce the time domain equivalent of an input frequency domain signal.

The second message signals generated by converter 20 are conducted over line 22 to modulator 24 which includes circuitry conditioning the signals for transmission over communication channels 14, said signals being applied to the channel by line 26. Modulator 24 may employ amplitude, frequency or phase modulation. Where signals on line 22 have no direct current component, modulator 24 and its receiving station counterpart may of course be dispensed with.

Receiving station 12 includes a demodulator 28 which receives over line 30 transmitted second message signals are operated upon by communication channel 14. The demodulated received signals are conducted over line 32 to a signal converter 20 and is particularly adapted to generate output signals representing the frequency spectrum of applied signals. In the transmission system of FIG. 1, converter 34 is operative to modify each received signal by generating in response thereto an output signal representing the frequency spectrum thereof. As in the case of converter 20 this device may be a Fourier transform computer, operative in reverse manner to produce the frequency domain equivalent of an input time domain signal. The output signals of converter 34 are applied over line 36 to a signal utilization device 38. Various Fourier transform computers are commercially available, e.g., the Time/Data 100, manufactured by Time/Data Corp., Palo Alto, Calif.

The ability of the system of FIG. 1 to exchange information with reduced noise effects is best understood by considering the operation of the system in exchanging a single discrete original message signal generated by source 16 during a period in which common spike noise is present on communication channel 14. By spike noise is meant any extraneous signal appearing on the channel having an amplitude approaching or exceeding a transmitted signal and a period approaching or exceeding that of a transmitted signal, i.e. having noise power approaching transmitted signal power. For simplification, it will be assumed that the channel transmission characteristic is ideal (unity) and that signal modulation is not required.

In a system not including signal converters 20 and 34, said original message signal generated by source 16 would be applied directly to the communication channel. Assuming spatial coincidence of the transmitted signal and spike noise, the signal emanating from the channel evidently will have a noise power content approaching that of the signal or information power content and, thus noise affected, may be unintelligible. Where spatial coincidence does not occur, there will evidently be received two time-displaced signals of like power content, one representing noise and the other information, a clearly erroneous information exchange resulting from noise effects.

In the system of FIG. 1, the single discrete original message signal generated by source 16 is not applied to the communication channel as in the above system. Rather, there is applied to the channel the second message signal generated by converter 20, the frequency spectrum of which is indicated in the original message signal, representative thereof. As this signal is propagated spike noise again will be spatially coincident therewith or will appear as a further signal in time sequence therewith. Converter 34 of receiving station 12 receives the signal or signals emanating from the communication channel and proceeds to generate a single discrete output signal representative of the frequency spectrum of received signals.

This single output signal of converter 34 contains both information intended to be exchanged and channel noise, as did the above discussed received signal in the system not including signal converters 20 and 34. The information content of such single signal is identical with the information content of the original message signal generated by generator 16, since complementary transformations of the original message signal were performed respectively by converters 20 and 34. Converter 20 was operative to transform the original message signal from the frequency to the time domain and, conversely, converter 34 was operative to transform this time domain signal back to the frequency domain. Channel noise will have uniform time distribution in the converter 34 output signal as will be evident presently.

Converter 34 operates, as mentioned above, to examine its input signal and indicate the frequency distribution thereof. If the converter input signal is a noise spike occuring over a short time relative to the message time period, the converter output will be a constant amplitude pedestal of substantially lower magnitude than the noise spike and extending over substantially the entire message time period. This redistribution or spreading of spike noise occurs by reason of the fact that such noise is substantially uniform in its frequency distribution. In effect converter 34 reproduces the original message signal with the amplitude thereof being uniformly increased by distribution of spike noise over the entire message signal time period.

Figure 2:
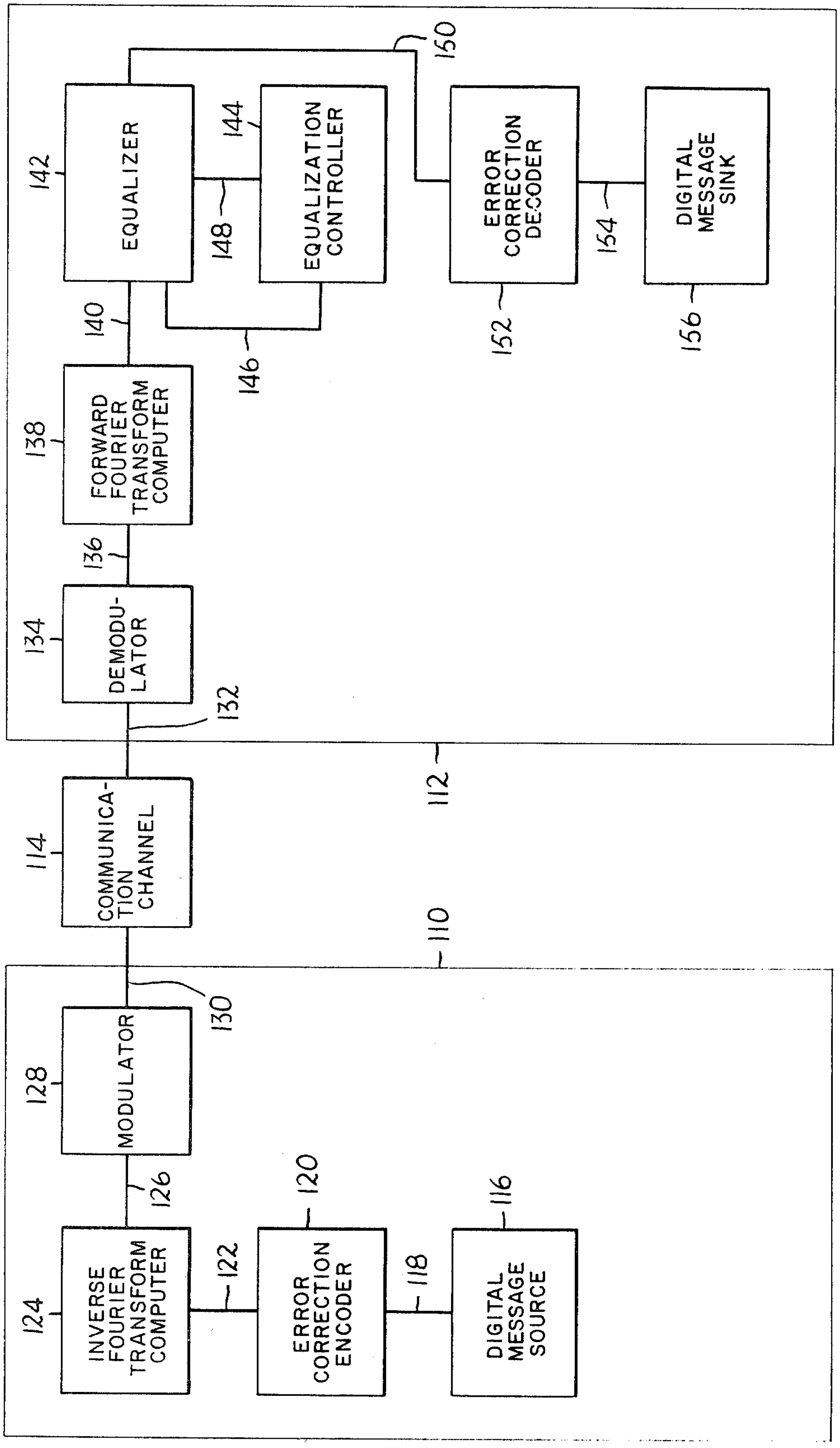
FIG. 2 is a functional block diagram of a digital signal transmission system constructed in accordance with the invention and incorporating a communication channel equalizer and error correction apparatus.

It will be further evident that cooperation of converters 20 and 34 in the exchange of original message information by signal conversion and reconversion is effective to substantially reduce the tendency for spike noise to obliterate information with which the noise is spatially coincident. Likewise, errors induced by reason of channel noise spatially noncoincident with information is substantially eliminated. By way of contrast, the system of the prior art, not including converters 20 and 34 and wherein the original message signal is directly transmitted, is clearly susceptible to both said effects attributable to noise to a substantially greater extent.

Where the information to be exchanged between a transmitting and receiving station constitutes digital signals, it has been customary to include in the prior art transmission systems error correction apparatus. It has also been customary to include in practical transmission systems of this type apparatus for compensating transmitted signals for distortions induced therein by the departures of the communication channel amplitude and phase frequency response characteristic from the ideal (flat) characteristic. Such apparatus is generally termed channel equalization apparatus and is incorporated in the channel receiver to compensate received signals prior to error correction and utilization thereof. FIG. 2 illustrate such a transmission system employing the apparatus and method of the invention in conjunction with error correction and equalization apparatus.

Referring to FIG. 2, information is exchanged between transmission station 110 and receiving station 112 over communication channel 114. The transmitting station includes a digital message source 116 generating batches of original message digital signals. The signals are conducted over line 118 to an error correction code encoder 120. This apparatus functions to insert into the batches of applied digital signals further pulses in accordance with a stored error correction code. For example, $x$ error control bits may be calculated by the encoder to indicate independently the correct contents of $y$ data bits generated by source 116 by an error correction code in which each of the error control bits is assigned to a particular combination of data bits, e.g. even pairs, alternate odd pairs, etc. The ratio of $y$ to $x$ is selected to provide maximum transmission by volume of intelligible information (data bits) and yet provide adequate error detection and correctability for the information. The composite original message, now comprising $x$ (data) and $y$ (correction) bits or signals is applied over line 122 to inverse Fourier transform computer 124. This signal conversion device is of identical function to signal converter 20 of FIG. 1 operative to generate second message signals, each discrete original message signal representing the frequency spectrum of a discrete second message signal. The second message signals are applied over line 126 to modulator 128 and thence is modulated condition over line 130 to the communication channel.

In transmission over communication channel 114 the modulated second message signals are convolved with the channel transmission characteristic and combined with noise signals appearing on the channel. In such convolution, distortions attributable to variations in the said amplitude and phase frequency response characteristic of the channel are induced in said message signals.

Signals emanating from the communication channel are conducted over line 132 to demodulator 134 and thence over line 136 to a forward Fourier transform computer 138. This signal conversion device is of identical function to signal converter 34 of FIG. 1, and operates in a complementary manner with respect to the counterpart transmitting station signal conversion means 124. In particular, computer 138 is operative to generate in response to discrete input signals, single discrete output signals representative of the frequency spectrum of said input signals. As discussed above, output signals of the receiver signal conversion means do not exhibit spike noise characteristics, channel noise being substantially uniformly distributed therein.

Distortions attributable to the channel transmission characteristic in output signals provided by computer 138 on line 140 are compensated by equalizer 142. This device is adapted to compensatingly distort applied signals in response to an equalization controller 144 which provides equalization control signals over line 146 to equalizer 142. Controller 144 receives over line 148 preliminarily equalized signals, i.e. signals compensatingly distorted by prior setting of equalizer 142. Controller 144 is operative upon receipt of such preliminarily equalized signals to compare same with a standard and modify the control signal provided on line 146. With this modified control setting equalizer 142 functions to further modify its distortion-compensating effect on computer 138 output signals. The equalization process is dynamic in nature, the control signal on line 146 varying about an equilibrium level in accordance with variations in the communicating channel transmission channel.

Circuit elements 142 and 144 may be comprised of numerous known communication channel equalization devices. For example, the transversal filter, such as is described in *Bell System Technical Journal*, Feb. 19, 1966, pages 255—286, is readily employable to perform the required functions of elements 142 and 144. As will be observed in this reference, the transversal filter is a variably settable multiple tap filter through which signals to be equalized are passed, the taps being set in accordance with control signals generated by comparison of applied signals and a weighted standard. The filter is operative to modify the phase and/or amplitude characteristics of applied signals.

Equalized converted received signals are applied over line 150 to error correction code decoder 152. This decoder has stored therein the system error correction code as in the case of encoder 120. The decoder operates upon applied digital signals, extracting therefrom the *y* (error correction) bits and thus segregating transmitted information. Upon analysis of the data and the error correction bits, the decoder performs any necessary corrections to the data. Where the requisite correction is within the capacity of the decoder, corrected data signals are applied over line 154 to digital message sink 156. Extensive discussion of error correction techniques and of particular error correction codes is presented in *Error-Correcting Codes*, by W. W. Peterson, published jointly by M.I.T. Press and John Wiley & Sons, Inc. (1961). Error correction encoder apparatus is set forth in this text in FIG. 12.6, and error correction decoder apparatus is set forth in FIGS. 12.7 and 12.8.

It will be seen that the transmission system of FIG. 2 includes distinct functional circuit groups for elimination or substantial reduction of various system errors. Circuit elements 124 and 138 are operative to enable original message exchange, substantial reduction of effects therein attributable to channel noise. Circuit elements 142 and 144 cooperate to enable original message exchange with elimination or substantial reduction of effects therein due to nonideal communication channel transmission characteristics. Circuit elements 120 and 152 are operative to enable such nominal correction of errors in exchanged original message information as may be induced by extraneous other transmission system effects.

Where the original message signals are digital signals, circuit elements 20, 124, 34 and 138 are preferably digital computers, appropriately programmed to compute inverse fast Fourier transforms in the case of converters 20 and 124 and to compute forward fast Fourier transforms in the case of converters 34 and 138. Digital computer application to Fourier transform computation as a general computational procedure is discussed in *IEEE Transactions on Audio and Electro Acoustics*, June 1967, pages 79—84, to which reference may be had for practical information on the detailed operations involved in digital Fourier transform computation. Specific discussion of the implementation of the IBM 7094 computer for Fourier transform computation is presented in *Proceedings—Fall Joint Computer Conference*, 1966, pages 563—578.

While the invention has been disclosed by way of the several particular embodiments of transmission systems and preferred method and apparatus for performance of the features of the invention, it will be evident that various changes and modifications may be introduced therein by those with ordinary skill in the art to which the invention pertains. The foregoing disclosure is thus intended in a descriptive and not in a limiting sense. The full scope of the invention will be evident from the following claims.

What I claim is:

1. A method for exchanging the information content of first message signals over a noise-affected communication channel with reduction of adverse effects of communication channel noise, comprising the steps of:

a. generating second message signals in such manner that each of said first message signals is indicative of the frequency spectrum of one of said second message signals;

b. transmitting said second message signals over said communication channel;

c. generating third signals in such manner that each of said third signals is indicative of the frequency spectrum of one of said transmitted second message signals, each of said third signals constituting one of said first message signals with channel noise substantially uniformly distributed therein.

2. The method claimed in claim 1 comprising further an initial step of error correction encoding said first message signals, and the successive terminal steps of error correction decoding and error correcting said third signals.

3. The method claimed in claim 1 comprising the further step of equalizing said second message signals after said transmission thereof and prior to said step of generating said third signals.

4. The method claimed in claim 1 comprising the additional step of modulating said second message signals prior to said transmitting step and the further step of demodulating said transmitted modulated second message signals prior to said step of generating said third signals.

5. The method of claim 1 wherein the step of generating said second message signals is performed by computing the inverse Fourier transform of each of said first message signals and producing signals indicative of the result of said computation and wherein the step of generating said third signals is performed by computing the forward Fourier transform of said transmitted second message signals and producing signals indicative of the result of said computation.

6. A signal transmitter comprising:

a. means generating first signals;

b. signal conversion means receiving said first signals and converting same into second signals, said first signals being indicative of the frequency spectra of said second signals; and c. signal-conducting means applying said second signals to an associated communication channel.

7. The signal transmitter claimed in claim 6 wherein said signal-conducting means includes a signal modulator.

8. The signal transmitter claimed in claim 6 wherein said first signals are digital signals and wherein said signal conversion means includes means for computing the inverse Fourier transforms of said first signals.

9. The signal transmitter claimed in claim 8 wherein said means generating said first digital signals includes means error correction encoding said signals.

10. A signal transmission system for exchanging the information content of first message signals over a noise-affected communication channel with reduction of adverse effects of communication channel noise, comprising:

a. a transmitting station including:

a–1. a source generating said first message signals;

a–2. signal conversion means receiving said first message signals and converting each of said first message signals into a second message signal, each of said first message signals being indicative of the frequency spectrum of one said second message signal; and a–3. signal-conducting means applying said second message signals to said communication channel; and b. a receiving station including:

b–1. signal-conducting means receiving transmitted second message signals from said communication channel; and b–2. signal conversion means receiving signals from said receiving station conducting means and converting each of said signals into a third signal, each of said third signals being indicative of the frequency spectrum of one said signal received from said conducting means, each of said third signals constituting one of said first message signals with channel noise substantially uniformly distributed therein.

11. The signal transmission system claimed in claim 10 wherein said transmitting station signal-conducting means includes a signal modulator and wherein said receiving station signal-conducting means includes a signal demodulator.

12. The signal transmission system claimed in claim 10 wherein said first message signals are digital signals and wherein said transmitting station signal conversion means includes means for computing the inverse Fourier transform of each said first message signal and wherein said receiving station signal conversion means includes means for computing the forward Fourier transform of each signal received from said receiving station signal-conducting means.

13. The signal transmission system claimed in claim 12 wherein said receiving station includes means equalizing said third signals for distortion induced therein by said communication channel.

14. The signal transmission system claimed in claim 12 wherein said transmitting station first message signal-generating means includes means error correction encoding said first message signals, and said receiving station includes means error correction decoding and error correcting said third signals.